US012756987B2

(12) United States Patent
Delikaris Manias et al.

(10) Patent No.: US 12,756,987 B2
(45) Date of Patent: Oct. 6, 2026

(54) METHOD AND SYSTEM FOR ESTIMATING PARAMETERS

(71) Applicant: Apple Inc., Cupertino, CA (US)

(72) Inventors: Symeon Delikaris Manias, Playa Vista, CA (US); Juha O. Merimaa, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 405 days.

(21) Appl. No.: 18/477,491

(22) Filed: Sep. 28, 2023

(65) Prior Publication Data

US 2025/0113158 A1 Apr. 3, 2025

(51) Int. Cl.
*H04S 7/00* (2006.01)

(52) U.S. Cl.
CPC ................ *H04S 7/40* (2013.01); *H04S 7/305* (2013.01)

(58) Field of Classification Search
CPC ............. H04S 7/40; H04S 7/305; H04S 7/301
See application file for complete search history.

(56) References Cited

U.S. PATENT DOCUMENTS 10,798,511 B1 10/2020 Sheaffer et al.
2016/0004499 A1* 1/2016 Kim ..................... H04R 29/008 715/716
2020/0288259 A1* 9/2020 Pinto ....................... G06F 3/167

OTHER PUBLICATIONS

Delikaris-Manias et al., "DOA estimation with histogram analysis of spatially constrained active intensity vectors", received from https://ieeexplore.ieee.org/document/7952211, Mar. 5-9, 2017, 5 pages.
Cobos et al., "An overview of machine learning and other data-based methods for spatial audio capture, processing, and reproduction", received from https://asmp-eurasipjournals.springeropen.com/articles/10.1186/s13636-022-00242-x, May 16, 2022, 21 pages.

* cited by examiner

*Primary Examiner* — Fan S Tsang
*Assistant Examiner* — Tyler Michael Liebggot
(74) *Attorney, Agent, or Firm* — Aikin & Gallant, LLP

(57) ABSTRACT

A method performed by at least one programmed processor of an electronic device, the method includes receiving audio content and, for a first group of points associated with a three-dimensional (3D) sound field of the audio content, estimating a first group of spatial parameters associated with the audio content. The method generates a second group of points associated with a region of the 3D sound field of the audio content based on a comparison of the estimated spatial parameters of the first group of points, where the first group of points includes less points than the second group of points. The method, for the second group of points, estimating a second group of spatial parameters associated with the audio content and storing the second group of spatial parameters associated with the audio content.

18 Claims, 7 Drawing Sheets

METHOD AND SYSTEM FOR ESTIMATING PARAMETERS

FIELD

An aspect of the disclosure relates to a system that estimates parameters using iterative search grids. Other aspects are also described.

BACKGROUND

Ambisonics is a surround sound format in which a sound field may be represented by a summation of spherical harmonic functions. As the spherical harmonic functions are extended to include higher-order elements (order of two and higher), the representation of the sound field may become more detailed, thereby having a higher spatial resolution during spatial reproduction of the sound field. The term higher-order ambisonics ("HOA") may be used to generically refer to such a representation of the sound field.

SUMMARY

An aspect of the disclosure may include a method and a system for estimating spatial parameters. Audio content may be received, which may include a three-dimensional (3D) sound field, such as in an ambisonics format. For a first group of points associated with the 3D sound field of the audio content, a first group of spatial parameters associated with the audio content are estimated. Spatial parameters may include at least one of a direction of arrival (DoA) of a sound source within the 3D sound field, a reverberance value, a diffuseness value, and a sound energy value. A second group of points associated with a region of the 3D sound field of the audio content is generated based on a comparison of the estimated spatial parameters of the first group of points, where the first group of points includes less points than the second group of points. For instance, the first group of points may be an order of magnitude less than the second group of points. In one aspect, the first group of points may be arranged on a spherical grid of (e.g., spatially representing) the 3D sound field and the region may be a conical spherical shaped section of the spherical grid of the 3D sound field. For the second group of points, a second group of spatial parameters may be estimated that are associated with the audio content, and the second group of spatial parameters associated with the audio content may be stored in memory.

In one aspect, the method may also include determining that a spatial parameter of the first group of spatial parameters is greater than or equal to a threshold based on the comparison, and generating the conical spherical shaped section centered at the point, where the second group of points may include the point. In another aspect, the first group of points may be generated as a predefined number of points at predefined locations on the spherical grid.

In another aspect, the method includes determining whether a spatial parameter of the second group of spatial parameters is greater than or equal to a threshold, and responsive to determining that none of the second group of spatial parameters are greater than or equal to the threshold, reducing the region of the 3D sound field of the audio content; estimating a third group of spatial parameters associated with the audio content for a third group of points associated with the reduced region, and storing at least one of the third group of spatial parameters in memory. In another aspect, storing the second group of spatial parameters includes, responsive to determining that the spatial parameter is greater than or equal to the threshold, storing the spatial parameter.

According to another aspect of the disclosure is an electronic device that includes at least one processor; and memory having instructions stored therein which when executed by the at least one processor causes the electronic device to: receive audio content, for a group of points associated with a 3D sound field of the audio content, estimating a group of spatial parameters associated with the audio content; determining a region of the 3D sound field based on a comparison between the group of spatial parameters; iteratively, reducing the region of the 3D sound field and estimating new spatial parameters associated with the audio content for one or more new points in the reduced region, until one or more new spatial parameters meet or exceed a threshold, wherein each region comprises a density of new points that is higher than a density of the plurality of points of the 3D sound field; store the one or more new spatial parameters in the memory.

In one aspect, the group of points are arranged on a spherical grid and the region is a conical spherical shaped section of the spherical grid, where each reduced region is a smaller conical spherical shaped section of the spherical grid. In another aspect, each reduced region is smaller and has a higher density of new points than each previous iteration of the reduced region. In some aspects, the audio content comprises a group of channels in an ambisonics format. In another aspect, the electronic device includes a portable device with an internal power source. In another aspect, the electronic device further includes one or more microphones, where the instructions to receive audio content includes receiving, as one or more microphone signals captured by the one or more microphones, sound of an ambient environment as the 3D sound field.

According to another aspect of the disclosure is a non-transitory machine-readable medium having instructions which when executed by at least one processor of an electronic device causes the electronic device to: for a first group of points associated with a 3D sound field of audio content, estimate a first group of spatial parameters associated with the audio content; generate a second group of points in a region of the 3D sound field of the audio content based on a comparison of the first group of spatial parameters of the audio content, where the first group of points comprises less points than the second group of points; for the second group of points, estimate a second group of spatial parameters associated with the audio content; and store at least one of the second group of spatial parameters associated with the audio content.

In one aspect, the non-transitory machine-readable medium includes further instructions to select at least one of the second group of spatial parameters that is greater than a remainder of the second group of spatial parameters or a threshold value. In another aspect, the non-transitory machine-readable medium includes further instructions to select a point of the first group of points based on its corresponding spatial parameter's relationship with spatial parameters of neighboring points of the first group of points; and creating the region to include the selected point. In another aspect, the point is a part of the second group of points in the region. In some aspects, the first group of points are arranged uniformly on a surface of spherical grid of the 3D sound field, and the second group of points are arranged non-uniformly on a surface of the region that is a conical spherical shaped section of the spherical grid. In one aspect, the first group of points comprise less than thirty points.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
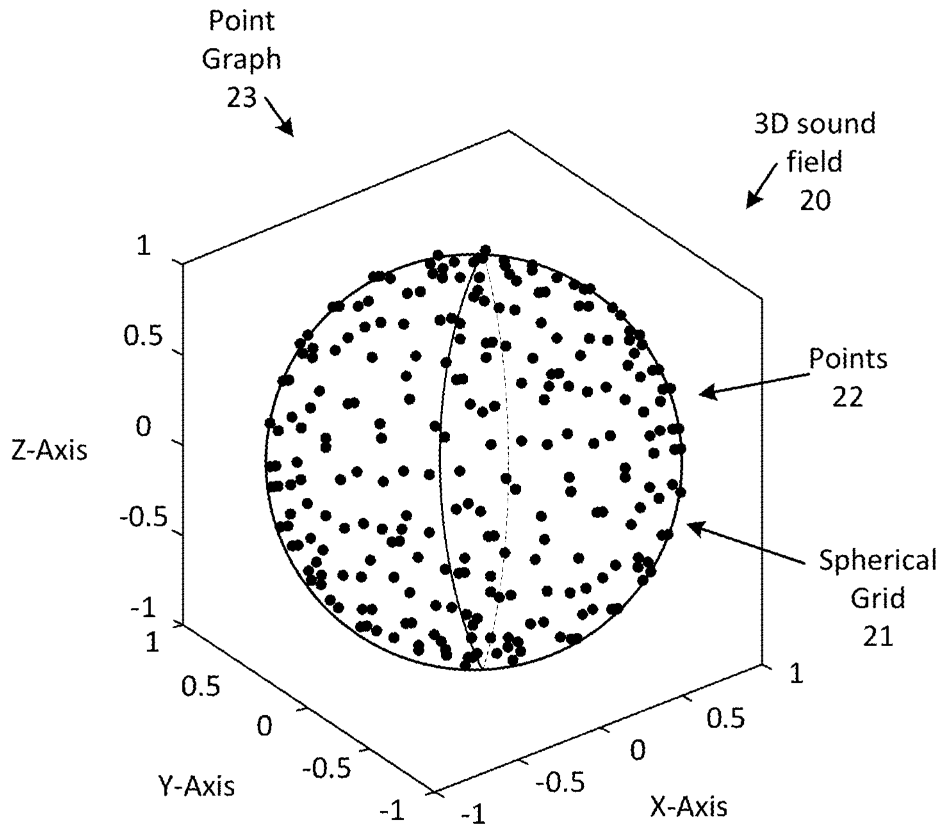
FIG. 1 is an example a point graph in which hundreds of points around a spherical grid are used to estimate spatial parameters according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Audio content (e.g., an audio program file) may be recorded and stored in a spherical audio format, such as an ambisonics audio format. In which case, a sound field may be recorded as an ambisonics representation (ambisonics data) and stored as an audio file. As an example, audio content may be recorded using a microphone array (e.g., using a special microphone array with microphones arranged in a particular arrangement, such as a spherical microphone array), and stored as several channels, such as ambisonics B-format or higher order. As another example, a sound field, such as sound of a virtual environment may be produced (e.g., mastered) in an ambisonics format. Ambisonics audio format has flexibility when compared to other types of audio formats that specify specific playback configurations, such as stereo, 5.1 surround sound, etc., because ambisonics audio recordings can be rendered to different playback configurations. In other words, ambisonics audio recording files do not specify or require a particular playback arrangement.

A higher-order ambisonics (HOA) signal may be characterized by a high number of channels. In particular, a three-dimensional (3D) sound field representation of (a piece of) audio content may include (e.g., be represented by) a number of (ambisonics) channels defined by $(M+1)^2$, where M is the order. For example, a first-order ambisonics (FOA) recording may include four channels, a $2^{nd}$ order ambisonics recording may include nine channels, while a $3^{rd}$ order ambisonics recording may include sixteen channels. Different orders of ambisonics may include different spatial resolutions during playback. In particular, the spatial resolution of an ambisonics recording may depend on its order. For example, the FOA recording may have a low spatial resolution, due to only having four audio channels that may result in blurry sound sources during rendering and playback by an audio rendering system. As the order increases, however, sound sources may sharpen, thereby improving the listener experience.

There may be two methods for capturing and rendering a 3D sound field using ambisonics as an input format. A first may be a non-parametric (or linear) spatial audio rendering process. In this approach, ambisonics signals may be captured by an ambisonics microphone and may be mixed linearly to produce a desired output format, such as a stereo format (e.g., for headphones) or a surround sound format, such as 5.1 surround sound format. For example, the FOA includes four signals: a signal W corresponding to an omnidirectional beam pattern, and three signals, X, Y, and Z, which correspond to different figure-of-eight patterns. To linearly produce a stereo reproduction, which includes a left channel and a right channel, the FOA may be spatially rendered by combining at least some of the ambisonics signals. For instance, the left channel may be a linear combination of the W signal and Y signal, while the right channel may be a difference between the W signal and the Y signal. As a result, a non-parametric spatial audio reproduction of an ambisonics signal may require a small amount of computational power, but may not provide sufficient spatial resolution during playback.

A second method is a parametric spatial audio (rendering) process, which may provide a higher resolution capture and rendering performance than the linear approach. In this approach, a sound field may be captured as a set of ambisonics signals and analyzed through a parametric spatial audio (e.g., sound field) analysis to estimate a set of spatial parameters (which herein may be referred to as "parameters") that describe the captured sound field. In particular, a "parameter" may be any spatial characteristic that may help to define or classify one or more properties of a sound field. Examples of parameters may include a direction of arrival (DoA) that may be associated with a sound source of a sound field, or a diffuseness value of (at least a portion of) the sound field. The parameters, along with at least some of the original ambisonics signals may be used by a spatial audio renderer to synthesize the captured sound field and render it for any type of speaker layout, such as headphones or loudspeakers.

Unlike non-parametric spatial audio rendering, parametric rendering may require a significant amount of computational power. In particular, the estimation of the spatial parameters may be computationally expensive. To determine parameters, the ambisonics signals may be analyzed and discretized over hundreds to thousands of points around a 3D representation of a 3D sound field, where each point may indicate a position about the 3D sound field with respect to a listener position (at the center of the sound field). FIG. 1 is an example a point graph 23 in which hundreds (or thousands) of points 22 are positioned around (making up) a spherical grid 21 associated with a 3D sound field 20, which may be used for a sound field analysis to estimate spatial parameters.

These points 22 may be used to determine spatial characteristics of the sound field at that position in the sound field (with respect to a center of the spherical grid 21, which may be the listener position). For example, to estimate a DoA of one or more sound sources within the 3D sound field 20, spatial characteristics, such as sound energy, may be calculated at each point and the DoA may be determined as corresponding to the point where most (or greater than a threshold) of the energy is coming from with respect to sound energy computed for the other points. The parametric analysis may determine how many DoAs are identified and where they are (with respect to a listener position). A spatial renderer may use this information to spatially render the sound sources into a desired audio format, as described herein. To do this parametric analysis, however, conventional requires estimation of spatial parameters across hundreds or thousands of points. This requires a significant amount of computational resources (e.g., processor power, memory, etc.), which may put a burden on a computing device, especially a device with a limited amount of computational resources and/or a limited power source, such as a handheld device (e.g., smartphone with an internal battery. Therefore, there is a need for a method and system that may efficiently and accurately estimate spatial parameters.

To solve this problem, the present disclosure provides a method and system for estimating parameters using iterative search grids. The system receives audio content and uses a first search grid to find one or more spatial parameters. In particular, the system estimates a first group of spatial parameters (e.g., DoA) associated with the audio content for a first group of points associated with a 3D sound field of the audio content. The system generates another search grid within the first search grid in order to refine the search for one or more spatial parameters. In particular, the system generates a second group of points associated with a region of the 3D sound field of the audio content based on a comparison of the estimated spatial parameters of the first group of points, where the first group of points includes less points than the second group of points, such as an order of magnitude less. The system estimates a second group of spatial parameters associated with the audio content for the second group of points, and stores the spatial parameters. As a result, rather than arranging hundreds of points around the sound field to identify spatial parameters, the present disclosure first searches a small group of points, and then reduces the search grid to a region (e.g., of interest). From this region, spatial parameters and be estimated and stored. As a result, the system only defines a few initial points to perform an initial estimation, and then based on the initial estimate, the system defines another set of points that may map to a denser grid of points to detect a spatial parameter. This is more efficient and requires less computational power than the conventional method, thereby allowing the process to be performed by an electronic device with limited computational resources and/or a limited power source.

Figure 2:
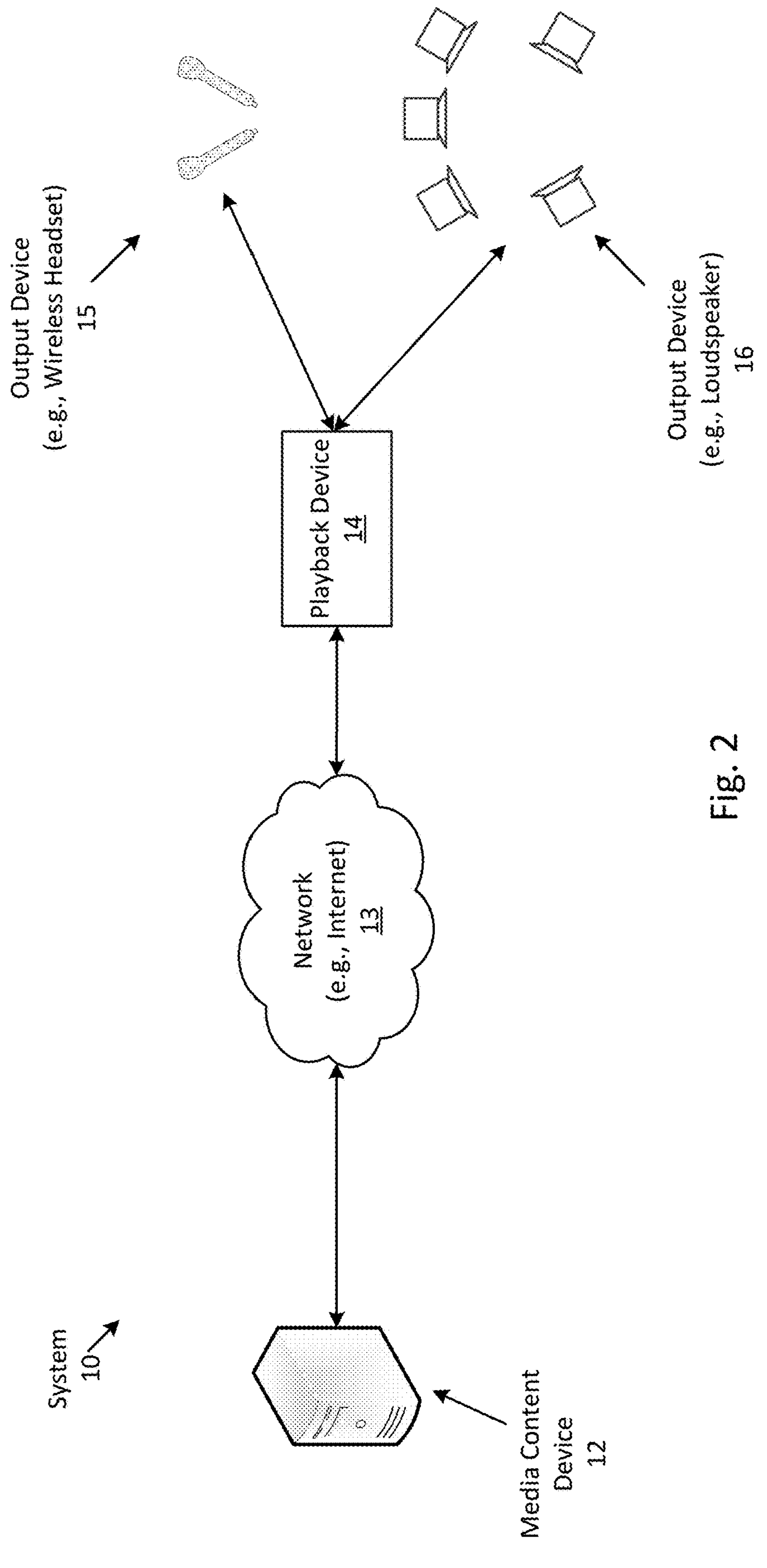
FIG. 2 shows a system that estimates parameters.

FIG. 2 shows an audio system (or "system") 10 that estimates parameters associated with audio content. The system may be configured to estimate the parameters for a parametric analysis of ambisonics signals to spatially render the signals into a (e.g., user-desired) format, such as 5.1 surround sound format. As described herein, the system may be capable of parametric spatial audio processing of audio content using minimal (or reduced) computational resources. The audio system includes a playback (or companion) device 14, a network 13 (e.g., a computer network, such as the Internet), a media content device (or server) 12, and output device 15 or output device 16. In one aspect, the system may include more or less elements. For example, the audio system may include other output devices, or may only include one output device, such as output device 15. As another example, the system may not include the media content device 12. As described herein, the media content device 12 may provide audio content to other devices, such as the playback device 14. In another aspect, the playback device may retrieve audio content from local memory instead of receiving the audio content from the media content device 12.

In some aspects, the media content device 12 may be a stand-alone server computer or a cluster of server computers configured to stream media content to electronic devices, such as the playback device and/or one or more output devices. In which case, the server may be a part of a cloud computing system that is capable of streaming data as a cloud-based service that is provided to one or more subscribers (e.g., of the local and/or remote device(s)). In some aspects, the server may be configured to stream any type of media (or multi-media) content, such as audio content that may include musical compositions, audiobooks, podcasts, etc., still images, video content that may include movies, television productions, etc. In one aspect, the server may use any audio and/or video encoding format and/or any method for streaming the content to one or more devices.

As referenced herein, "audio content" may be (and include) any type of (e.g., user-desired) audio, such as a musical composition, a podcast, audio of an XR environment, a soundtrack of a motion picture, etc. In another aspect, audio content may include sounds of one or more software applications (e.g., sounds of a virtual personal assistant (VPA) application), system sounds, or any type of sound for playback by an electronic device through one or more speakers. In another aspect, the audio content may include sounds of a call, such as a telephone call or a video conference (VOIP) call, which may be conducted by a telephony application with another electronic device. In which case, the audio content may include a downlink signal from the other electronic device. In one aspect, the audio content may be a part of a piece of audio content, which may be an audio program or audio file that includes one or more audio signals that includes at least a portion of the audio content. In some aspects, the audio program may be any type of audio content format. In one aspect, an audio program may include audio content for spatial rendering as one or more data files in one or various 3D audio formats, such as having one or more audio channels. For instance, an audio program may include a mono audio channel or may be a multi-audio channel format (e.g., two stereo channels, six surround source channels (in 5.1 surround format), etc.). In another aspect, the audio program may include one or more audio objects, each having at least one audio signal, and positional data (for spatially rendering the object's audio signals) in 3D sound. In another aspect, the audio program may be represented in a spherical audio format, such as FOA audio format or a higher-order format.

In some aspects, the playback device 14 may be any type of electronic device that may perform spatial audio processing operations and audio playback operations. For instance, the playback device may be a desktop computer, a laptop computer, a digital media player, etc. In one aspect, the playback device may be a portable electronic device (e.g., being handheld operable), such as a tablet computer, a smart phone, etc. In another aspect, the playback device may be a head-mounted device, such as smart glasses, or a wearable device, such as a smart watch.

As shown, the playback device 14 may be configured to communicatively couple with the media content device 12, via the network 13, such that both devices may be configured to communicate with one another using any communication protocol. In another aspect, any of the output devices may communicatively couple with the playback device 14 via the network 13. In one aspect, the network 13 may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wireless local area network (WLAN), a cellular network, etc., in order to exchange digital (e.g., audio) data. With respect to the cellular network, the playback device 14 may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones).

In another aspect, the devices may be configured to wirelessly exchange data via other networks, such as a Wireless Personal Area Network (WPAN) connection. For instance, the output device 15 may be configured to establish a wireless connection with the playback device 14 via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital (e.g., audio) data, which may include a representation of audio content that is being played back by the playback device 14.

As illustrated, the system 10 may include one or more output devices 15 and 16, each of which may be any electronic device that includes or may be communicatively coupled to at least one speaker and may be configured to output sound by driving the speaker. For instance, as illustrated, the output device 15 is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. In this case, the headset may include two earphones, a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In one aspect, the output device 15 may be any type of device that may be worn by a user and produce sound directed into the user's ears, such as a headset. In another aspect, the output device may be any type of electronic device that may be worn by a user, such as smart glasses. In one aspect, the device may include one or more "extra-aural" speakers, which may be arranged to output sound into the ambient environment rather than (directly) into the user's ears. In which case, the output device may be configured to use the extra-aural speakers to produce one or more beam patterns, each of which may include at least a portion of audio content in order to produce spatially selective sound output. Such beam patterns may be directed to locations within the environment, such as a location of the user's ears.

As illustrated, the output device 16 includes one or more loudspeakers. In particular, the output device 16 includes five loudspeakers that are arranged in a 5.1 surround sound loudspeaker arrangement. In one aspect, the output device 16 may be any electronic device that includes at least one loudspeaker that is arranged to output (or project) sound into an ambient environment. Examples may include a stand-alone speaker, a smart speaker, a home theater system, or an infotainment system that is integrated within a vehicle.

In one aspect, the playback device 14 may be configured to spatially render audio content to produce one or more output audio signals (or speaker drivers), with which the playback device may use to drive one or more speakers of the playback device 14, the output device 15, and/or the output device 16. For instance, upon producing the output audio signals, the playback device 14 may transmit the signals to the output device 15 for playback.

As described herein, the system 10 may be configured to perform spatial audio processing operations to estimate parameters for a parametric spatial audio analysis of (e.g., a 3D sound field of) audio content. For instance, one or more devices of the system may perform at least some of these operations, such as the playback device 14. In another aspect, either of the output devices may perform at least some of the operations described herein. In which case, the playback device may be an optional device, whereby an output device, such as output device 15, may receive audio content, estimate parameters, store the audio content and/or the estimated parameters, and/or spatially render the audio content according to the estimated spatial parameters through one or more speakers.

In some aspects, the playback device 14 and the output device 15 (or device 16) may be distinct (separate) electronic devices, as shown herein. In another aspect, the playback device may be a part of (or integrated with) an output device. For example, as described herein, at least some of the components of the playback device (such as a controller, memory, etc.) may be part of the output device 14, and/or at least some of the components of the output device, such as one or more speakers may be part of the playback device. In this case, each of the devices may be communicatively coupled via traces that are a part of one or more printed circuit boards (PCBs) within the devices.

Figure 3:
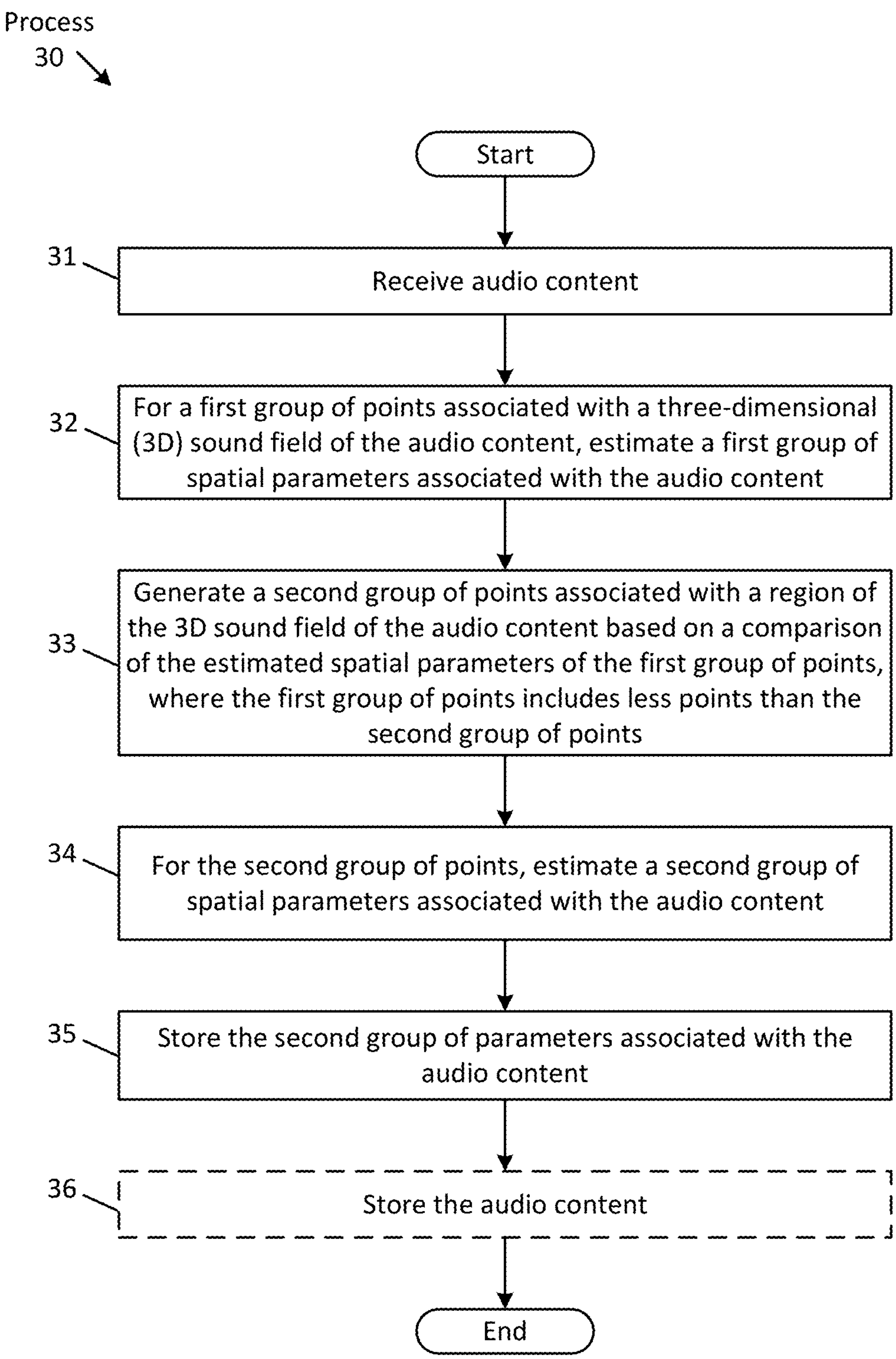
FIG. 3 is a flowchart of one aspect of a process performed by the system to estimate spatial parameters using an iterative search grid process according to one aspect.
Figure 4:
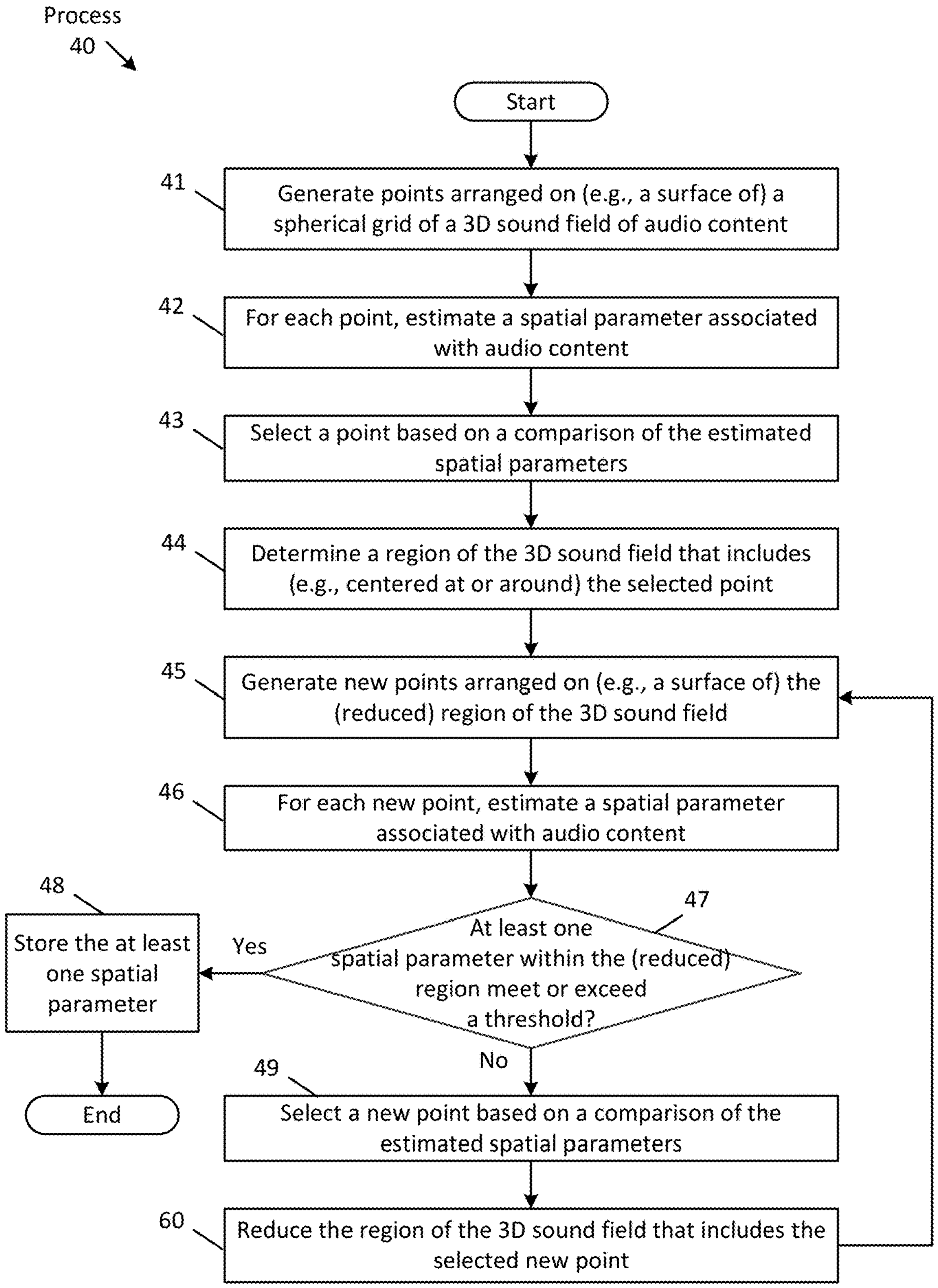
FIG. 4 is another flowchart of one aspect of a process performed by the system to estimate spatial parameters iteratively according to one aspect.

FIGS. 3 and 4 are flowcharts that include processes 30 and 40, respectively, that may be performed by system 10 for estimating parameters for a parametric spatial audio analysis of audio content, which may be in an ambisonics format. At least some of the operations of both (or either) of the processes 30 and 40 may be performed by, e.g., one or more processes (e.g., processor(s) 97 of FIG. 6) of one or more electronic devices of system 10, such as the playback device 14, the media content device 12, and/or the output devices 15 and 16.

Turning to FIG. 3, this figure is a flowchart of one aspect of the process 30 performed by the system 10 to estimate spatial parameters using an iterative search grid process according to one aspect. The process 30 begins with the system 10 receiving audio content (at block 31). In one aspect, the audio content may be in a spherical audio format, such that the audio content includes a 3D sound field. For instance, the system may receive an audio file that includes audio content (e.g., a musical composition, etc.) as several channels in an ambisonics format. In one aspect, the system may receive the audio content based on user input. For example, a user may request (e.g., via one or more user input devices, such as a touchscreen) a media software application being executed by the playback device 14 to stream audio content (e.g., from the media content device 12). In which case, the playback device 14 may receive the content through the network 13. In another aspect, the audio content may be a 3D sound field captured by one or more microphones of a microphone array. For example, the playback device 14 may include one or more microphones that may be arranged to capture ambient sound of an environment in which the playback device 14 is located as one or more microphone signals. In one aspect, the microphones may include one or more omnidirectional microphones and one or more dipole microphones, such that microphone signals of the microphones may include (and/or be used to produce) a 3D sound field.

The system 10 estimates, for a first group of points associated with the 3D sound field of the audio content, a first group of spatial parameters associated with the audio content (at block 32). In particular, the system may perform a sound field analysis of the audio content. In one aspect, to perform the analysis, the system may transform the audio content into the time-frequency domain. In particular, the audio content may include one or more audio signals in the time-domain. The system may produce time-frequency signals based on the time-domain signals of the audio content. For example, the time-frequency signals may include frequency components of the signals with respect to (or as a function of) time. Each of the points may be associated with a direction (or location) within the 3D sound field. For example, the sound field may be arranged around a (e.g., center) reference point, such as a listener position, where each point may be a position on the 3D sound field with respect to the reference point. For each point, the system may perform a sound field analysis upon one or more audio signals that make up the 3D sound field to determine one or more parameters associated with that position on the field. For example, the system may determine a DoA (value) associated with (one or more sound sources) at each point on the sound field based on an acoustic analysis of at least some of the time-frequency signals, such as being based on cross-correlation between two or more signals and/or acoustic intensity (e.g., sound energy levels). Other parameters may be determined for each point, which may indicate spatial characteristics of one or more sounds of the sound field, may include inter-channel level differences (ICLD), inter-channel time differences (ICTD), and/or inter-channel coherences (ICC). Other parameters may include a diffuseness value of the sound field and a reverberance value of the sound field. In one aspect, the system may use any method to determine any type of parameter that may provide a quantitative property of the sound field of one or more audio signals of the received audio content in the time-frequency domain. For instance, the DoA may be estimated using multiple signal classification analysis. In another aspect, the system may use (e.g., non-linear) machine learning based methods for parameter estimation.

The system 10 generates a second group of points associated with a region of the 3D sound field of the audio content based on a comparison of the estimated spatial parameters of the first group of points, where the first group of points includes less points than the second group of points (at block 33). In particular, the system may determine whether a region of the 3D sound field is of particular interest based on the estimated spatial parameters of the first group of points. For instance, the system may indicate that one or more points are associated with sound intensity above a particular threshold based on other estimated sound intensities. The system may then create a region based on the identified points (centered around the points), and generate a search grid within the region that includes more points. In one aspect, the density of points within the generated region may be greater (e.g., by an order or multiple orders of magnitude) than a density of the first group of points.

The system 10 estimates, for the second group of points, a second group of spatial parameters associated with the audio content (at block 34). Since these additional points may be arranged at different positions within the region of the 3D sound field than the original points, the system may estimate new parameters associated with those positions. In one aspect, these new parameters may be the same type of parameters as the original estimated group. The system stores at least some of the second group of parameters associated with the audio content (at block 35). In one aspect, the system 10 may stores points of the second group (and/or of the first group) that exceed a threshold. As described herein, the system may store the parameters, which may provide a more accurate representation of the spatial properties of the audio content than the originally estimated parameters, since those parameters may have been sparsely positioned about the sound field. The system 10 (optionally) stores the audio content (at block 36).

FIG. 4 is another flowchart of one aspect of the process 40 performed by the system 10 to estimate spatial parameters iteratively of a 3D sound field of audio content according to one aspect. The process 40 begins with the system 10 generating points arranged on (e.g., a surface of) a spherical grid of (associated with) a 3D sound field of audio content (at block 41). As described herein, the audio content may be in a spherical format, where the 3D sound field may be a spherical sound field orientated around a listener position. In which case, the system 10 may generate points on a spherical grid (making up the spherical grid) associated with the 3D sound field. Each of the points may represent a direction or location within the 3D sound field in a coordinate system, such as a Cartesian coordinate system or a spherical coordinate system. In one aspect, the generated points may be positioned about the spherical grid in a uniform manner. In particular, the points may be arranged uniformly on a surface of the spherical grid of the 3D sound field. In another aspect, the points may be randomly positioned about the grid. In another aspect, the number of generated points may be predefined and/or their locations on the spherical grid may be predefined. In another aspect, the generated points may include thirty points or less. Using such a small amount of points, which is in contrast to conventional parametric analysis methods that use hundreds or thousands of points, reduces the computational burden of parameter estimation.

The system 10 estimates, for each point, a spatial parameter associated with the audio content (at block 42). For example, the system may estimate a DoA spatial parameter that may be based on energy levels of one or more of the audio signals at a corresponding point along the 3D sound field. In another aspect, the spatial parameter that is estimated may be any type of spatial parameter that may quantify one or more properties of the sound field, as described herein.

The system selects a point based on a comparison of the estimated spatial parameters (at block 43). For example, the system may select a point associated with a corresponding spatial parameter that is greater than a remainder of the spatial parameters (and/or greater than a threshold value). As an example, when the spatial parameter is sound energy, the system may select the point of the 3D sound space at which the energy is the greatest (higher than energy levels associated with the other points of the 3D sound field). In another aspect, the system may select the point that is equal to or greater than a threshold based on the comparison. Continuing with the previous example, the system may select the point associated with a sound energy that is greater than or equal to a threshold energy level.

In another aspect, the system may select a point based on one or more surrounding (neighboring) points (e.g., points within a spherical threshold distance). For instance, the system may determine that spatial parameters of one or more points are above a threshold. This may be the case when one or more points on the sphere are located within (or around) a sound source within the 3D sound field. Upon identifying a group of points, the system may be configured to select at least one of the points, such as the point with the largest corresponding spatial parameter. In another aspect, the selected point may be based on its position with respect to the other points. For example, the selected point may be a point that is surrounded by (e.g., in the middle of) the other points. This may be the case with respect to DoAs. For example, the system may determine a DoA based on sound energy levels at a particular point above a threshold. Upon identifying a group of DoAs (e.g., that may be greater than a threshold or may be associated with energy levels that are greater than a threshold), the system may select a DoA that is within a spherical area surrounded by two or more other DoAs.

The system 10 determines a region of the 3D sound field that includes (e.g., centered at or around) the selected point (at block 44). As described herein, the 3D sound field may be initially represented as a spherical grid, where points are placed about the grid. Upon selecting a point (e.g., in response to identifying a point associated with a spatial parameter that may be greater than or equal to a threshold), the system may create (or select) a region of the spherical grid that may include the selected point. The region may be a conical spherical shaped section of the spherical grid of the 3D sound field that may include the selected point and may include other neighboring points. In one aspect, the conical section may be centered at the point.

In one aspect, the area of the region may be predefined. As described herein, multiple regions may be generated iteratively to identify one or more spatial parameters. In which case, each iteration of a created region may be smaller (e.g., by a value) than the previously created (previous iteration of a) region. In another aspect, the area of the region may be based on the spatial parameter associated with the selected point. For example, the size of the region may be based on the value of the spatial parameter, where the size may be based on whether the value of the spatial parameter is greater than one or more thresholds. In another aspect, the size of the region may be based on neighboring points of the selected points. For instance, if neighboring points are associated with spatial parameters that are greater than a threshold, the system 10 may adjust the size of the region to include these points along with the selected point.

The system 10 generates new points arranged on (e.g., a surface of) the region of the 3D sound field (at block 45). In one aspect, the newly generated points may be randomly positioned within the region. In another aspect, the newly generated points may be arranged non-uniformly on a surface of the region that may be a conical spherical shaped section of the spherical grid. In another aspect, the points may be positioned uniformly (e.g., at specific locations). In one aspect, the number of newly generated points may be greater than the initial points. As an example, the initially generated points may be an order of magnitude less than the number of newly generated points. In another aspect, the total number of points within the region may be one or more orders of magnitude greater than the region from which the new region was generated. For example, the generated region may include previously generated points, along with the newly generated points. In which case, the region may have a higher density of points than the density of points generated on the entire spherical grid. This increase in density may increase the area of the search grid to allow the system to estimate an optimal spatial parameter with higher accuracy for a position within the 3D sound field. In one aspect, the points within the region may include the newly generated points and any previously generated points that are within the area. For each new point, the system 10 estimates a spatial parameter associated with the audio content (at block 46).

The system determines whether there is at least one spatial parameter within the region that meets or exceeds a threshold (at decision block 47). In particular, the system 10 is determining whether the region includes one or more optimal spatial parameters. This determination may be based on a comparison between spatial parameters. In particular, the system may determine whether one or more of the spatial parameters associated with the newly generated points and/or associated with the previously generated points is greater than or equal to the threshold. For example, the system may determine whether one spatial parameter meets the threshold, or may determine whether multiple spatial parameters meet the threshold. In one aspect, this determination may also be based on the number of spatial parameters that meet the threshold. If so, the system 10 stores the at least one spatial parameter in memory (at block 48).

If, however, none of the spatial parameters are greater than or equal to the threshold, the system 10 selects a new point based on a comparison of the estimated spatial parameters (at block 49). In particular, the system may perform similar operations as described at block 43, such as selecting a point associated with a spatial parameter that meets or exceeds a threshold. The system 10 reduces the region of the 3D sound field of the audio content that includes the selected new point (at block 60). In which case, the system 10 may reduce the region as described in block 44.

The system returns to block 45 to generate new points arranged on the surface of the reduced region of the 3D sound field. As described herein, the density of points may increase with the reduction of the region. In which case, the number of generated points may increase from the previous iteration. As described herein, increasing the density of points may allow the system to generate spatial parameters with higher resolution. The system returns to block 46 to estimate spatial parameters for the new points, and then determines whether at least one spatial parameter within the reduced region meets or exceeds the threshold at decision block 47. As a result, the system may iteratively reduce the size of the region of the 3D sound field and estimate new spatial parameters associated with the audio content for one or more new points in the reduced region, until one or more (previously generated or newly generated) spatial parameters meet or exceed a threshold. Each region of a subsequent iteration increases the density of the search grid within the region with newly generated points (and existing points within the region), which may have a higher density of points of the 3D sound field than at least some of the previous iterations of reduced regions. Thus, each reduced region may be a smaller conical spherical shaped section of the spherical grid. In one aspect, the total number of points in a reduced region may be greater than the number of points in at least one larger region in the iteration (e.g., the region in the iteration in which the current reduced region was created). The increase in density of points allows the system to increase the overall resolution of spatial parameters associated with the 3D sound field and select one or more optimal spatial parameters. The system then stores one or more spatial parameters in memory, as described herein.

As described herein, the system 10 may perform the at least some of the operations of processes 30 and 40 to estimate spatial parameters of one or more points (positions) within the 3D sound field. As a result, the system 10 may perform the operations upon multiple points within the sound field in order to identify multiple spatial parameters. For example, a sound field may include multiple sound sources. In which case, the system may perform the parameter estimation operations described herein to identify DoA of each of the sound sources.

In another aspect, at least some of the operations may be performed in real time, such that parameter estimation may be performed as audio content is being received. In particular, the system 10 may perform at least some of the operations for each (or one or more) audio frames of the received audio content at a time in order to identify parameters, as the system 10 streams (retrieves) audio content. In one aspect, as described herein, the audio content may include one or more microphone signals captured by one or more microphones of the system. As a result, the system 10 may perform at least some of the operations in "real time", meaning that the system may estimate parameters as within a minimal amount of time (e.g., time due to audio processing from which ambient sound is captured by the microphones as the microphone signals. This is in contrast to conventional parameter estimation methods which would be unable to estimate parameters in real time due to computational resource constraints.

As described herein, the system 10 may be capable of parameter estimation using the iterative search grid approach. The system is able to estimate parameters using less computational resources than conventional methods, as described herein. As a result, a device with lesser computational resources may be capable of parameter estimation, such as a portable device with an internal power source. An example may include a smartphone.

As described thus far, the system 10 may perform one or more iterations to reduce the region of the 3D sound field at which a grid search is performed until at least one spatial parameter meets or exceeds a threshold. For example, when the spatial parameter is a reverberance value, the system 10 may perform the operations until the value is greater than or equal to a threshold. In another aspect, the system may perform a certain number of iterations, where at the last iteration the system selects one or more spatial parameters. For example, the system may perform operations at blocks 45, 46, 49, and 60, for a number of iterations. Once complete, the system may perform operations at decision block 47 to determine whether (or to select) one or more spatial parameters that meet or exceed a threshold.

The process 40 describes selecting one point based on a comparison of estimated spatial parameters, and then determining (creating) a region about that point in order to perform another search for one or more spatial parameters. In one aspect, the system may create a region based on a selection of multiple spatial parameters. For example, the system 10 may be configured to create a region around (and to include) a group of spatial parameters that meet or exceed a threshold. In which case, the system may create a region around points that are within a close proximity (e.g., within a threshold distance) and include corresponding spatial parameters that are greater than or equal to the threshold.

In one aspect, the system may be configured to compare estimated spatial parameters over a period of time in order to select one or more points (and/or to determine whether to store spatial parameters). For example, to determine DoA of sound sources, the system may determine whether an estimated DoA at a particular point fluctuates or is dominate over a period of time (e.g., one or more audio frames). A fluctuating DoA may indicate that a sound source is intermittent, whereas a dominate DoA may represent the location of an actual sound source. To determine whether a DoA fluctuates, the system may estimate energy at that location over several audio frames, and determine if the energy level fluctuates (e.g., increases above and below a threshold). The system may then select the point associated with the dominant DoA in order to either store the DoA or perform another grid search, as described herein.

In one aspect, the system 10 may spatially render the audio content using the spatial parameters. For example, the playback device may estimate one or more adaptive filters based on the parameters and/or at least some of the audio signals of a piece of audio content. For example, the filters may be sharpening filters that may provide spatial enhancements of a spatial rendering of the audio content. For instance, when applied to one or more audio signals, the sharpening filters may enhance the sound of one or more sound sources within a sound field. The sharpening filters may be any type of audio filter, such as high-pass filters, low-pass filters, band-pass filters, etc. In another aspect, the filters may be signal-dependent. In particular, the adaptive filters may include time-frequency adaptive weights, which may be adaptive based on changes to one or more audio signal(s) of the audio content. Thus, the playback device 14 may be configured to spatially render the audio content using the (e.g., filters based on the) spatial parameters according to a speaker layout of one or more output devices to produce one or more spatially rendered audio signals to drive one or more speakers of the output device. For the headset 15, the playback device 14 may be configured to produce two driver signals by spatially rendering the audio content for a headset. In one aspect, the playback device may apply one or more spatial filters, such as head-related transfer functions (HRTFs) upon the spatially rendered signals to produce binaural audio signals. In another aspect, the system 10 may spatially render the audio content using the spatial parameters and according to one or more speaker layouts, and store the spatially rendered audio content for later (e.g., transmission and/or) playback through one or more output devices.

FIGS. 5*a*-5*d* are examples of estimating spatial parameters using the iterative search grid according to one aspect.

Each of these figures illustrate a point graph 65 of a 3D sound field 50 in which an iterative search grid may be applied to at least a portion of the graph 65 to find one or more spatial parameters associated with audio content of the 3D sound field 50. These figures are described with respect to process 40 of FIG. 4.

Figure 5A:
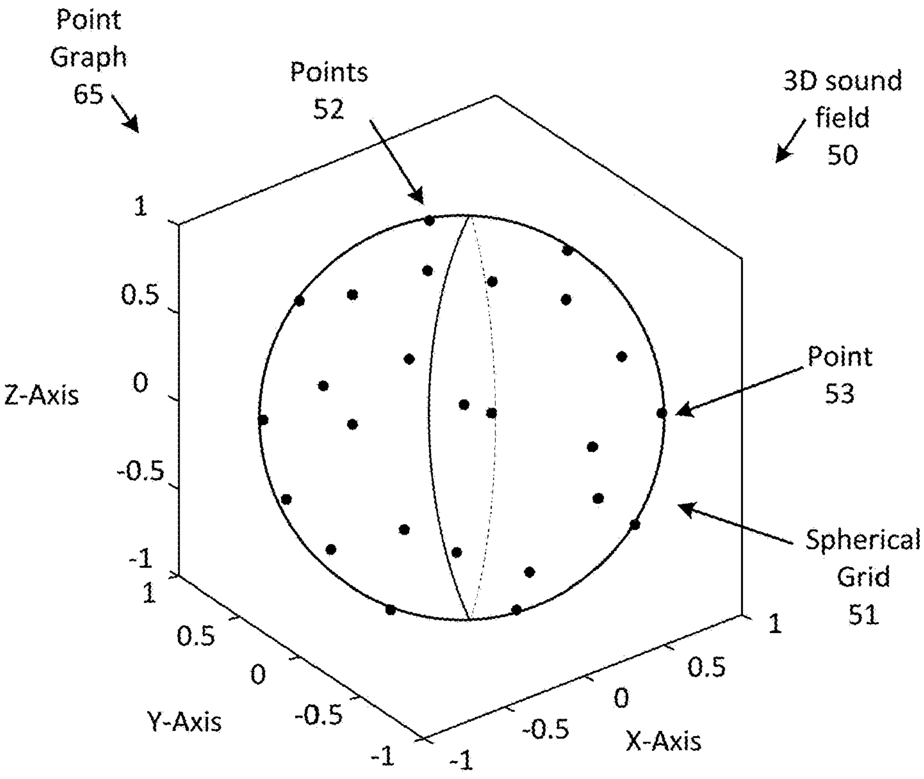
FIGS. 5*a*-5*d* are examples of estimating spatial parameters using the iterative search grid according to one aspect.

FIG. 5*a* shows a point graph 65 that includes a spherical grid 51 associated with a 3D sound field 50 of audio content, where the center of the spherical gird 51 may be associated with a listener position. On the grid are several points 52, which are shown as solid black dots. As shown, the points 52 are sparsely (and/or uniformly) arranged around the surface of the grid. This is in contrast to conventional parametric analysis methods, which generate a denser population of points on a spherical grid. In one aspect, the system 10 may estimate spatial parameters associated with audio content for at least some of the points 52, such as sound energy levels of the 3D sound field 50 at each of the points' positions. As shown, a point 53 has been identified as being a point of interest. In particular, the system 10 may select the point 53 based on a comparison of estimated spatial parameters associated with each of the points 52, as described in block 43 of process 40. For example, the selection may be based on the point's corresponding spatial parameter's relationship with spatial parameters of neighboring points of the points 52. As described herein, the point 53 may be selected based on a group of points, which may include point 53, meeting or exceeding a threshold.

Figure 5B:
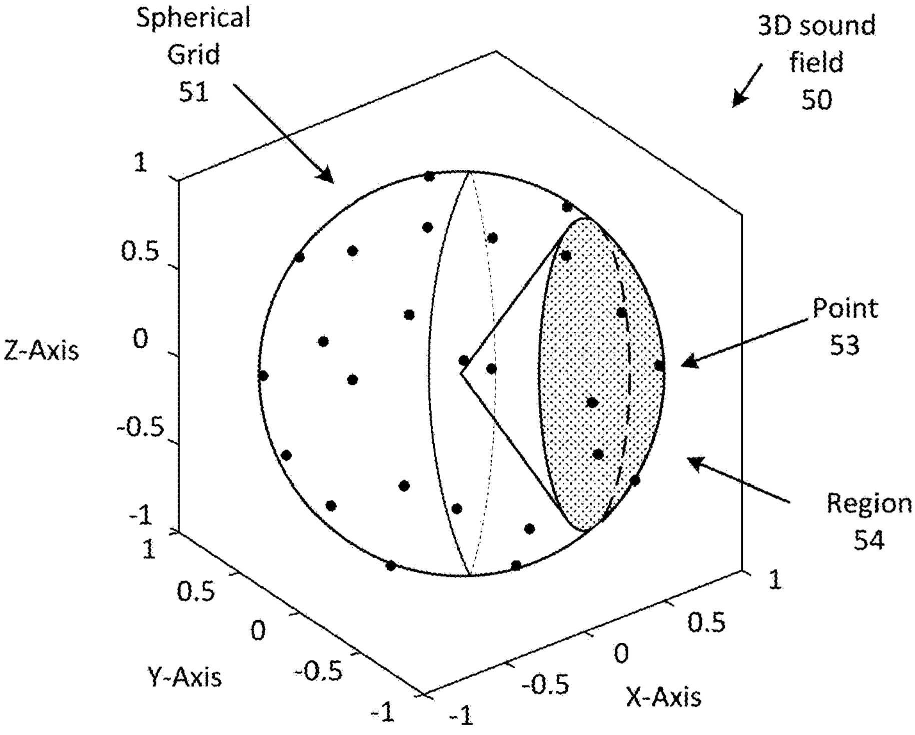

FIG. 5*b* shows the creation of a region 54 of the 3D sound field 50 based on and including the selected point 53. For instance, the system 10 may determine (create or identify) a region of the 3D sound field 50 based on a comparison between at least some of the estimated spatial parameters of the points 52. In particular, the system has created (or identified) the region 54 as a conical spherical shaped section of the spherical grid 51 that includes (and is centered at) the point 53, and includes some neighboring points 52. In one aspect, a size and/or shape of the region may be predefined, or may be based on various criteria. For instance, the size and/or shape may be based on the type of spatial parameter that is being estimated, other points within the spherical grid 51 (e.g., whether spatial parameters of neighboring points exceed a threshold), and/or user input that may indicate a user-desired size and/or shape.

Figure 5C:
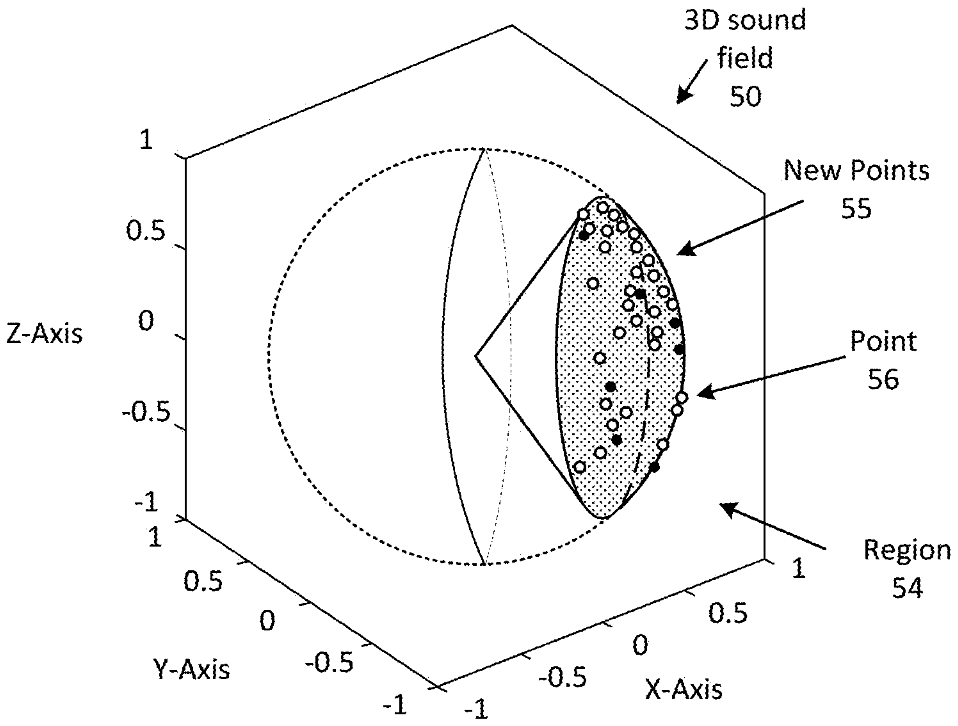

FIG. 5*c* shows the creation of new points 55, which are illustrated as white dots with black borders, within the region 54. As shown, the density of points within the region 54 may be greater than the density of points 52 within the spherical grid 51, as shown in FIG. 5*a*. As shown in this figure, the points within the region 54 may include the new points and the points that were previously generated. In another aspect, each time a new region is created, existing points within the region may be discarded and new points may be generated for the region. This figure also shows that a new point 56 has been selected based on a comparison of estimated spatial parameters associated with the points 55 and/or 52 within the region 54.

Figure 5D:
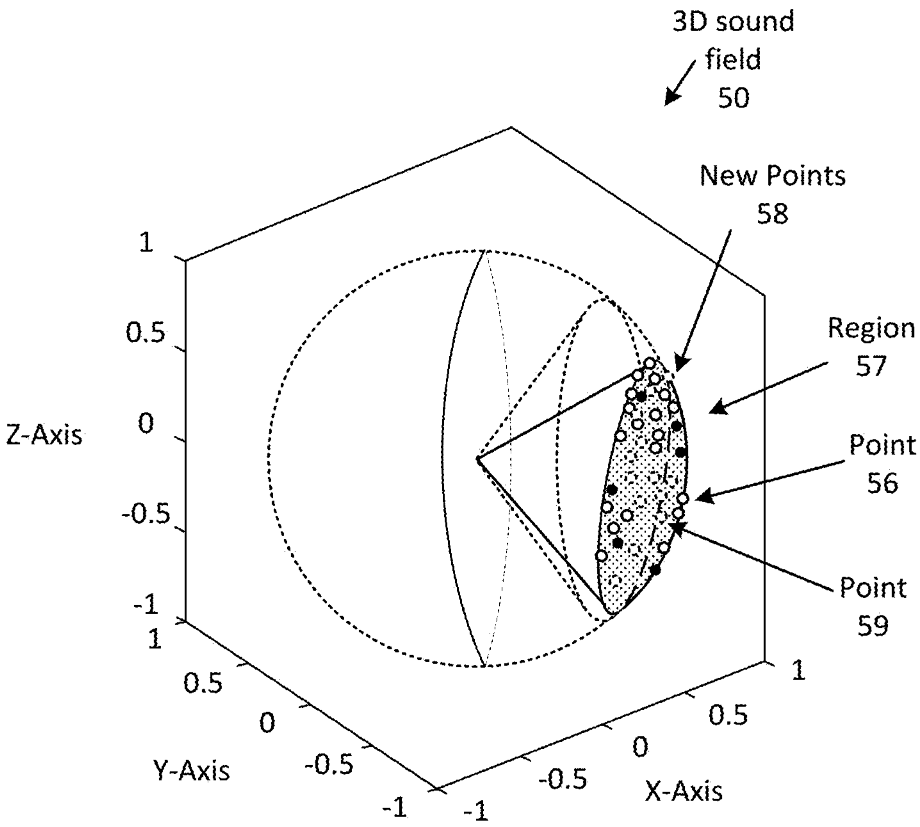

FIG. 5*d* shows the creation of a new region 57 within the previous region 54, where the region 57 may be created to include the point 56. In addition, this figure shows the creation of new points 58, which are illustrated as white dots with dashed borders, within the region 57. In this iteration, the system 10 may determine that an estimated spatial parameter of the point 59 is the most optimal spatial parameter (e.g., which most accurately represents the spatial characteristic of the 3D sound field 50), and may store the estimated spatial parameter. As described herein, the number of created regions may be based on the number of search grid iterations performed by the system 10 to identify one or more optimal spatial parameters. In one aspect, each created region may include all or at least some of the previously selected points from previously created regions. For instance, region 57 may include (at least) points 53, 56, and 59. In one aspect, a spatial parameter corresponding to any of these past selected points may be selected and stored as an optimal spatial parameter.

Figure 6:
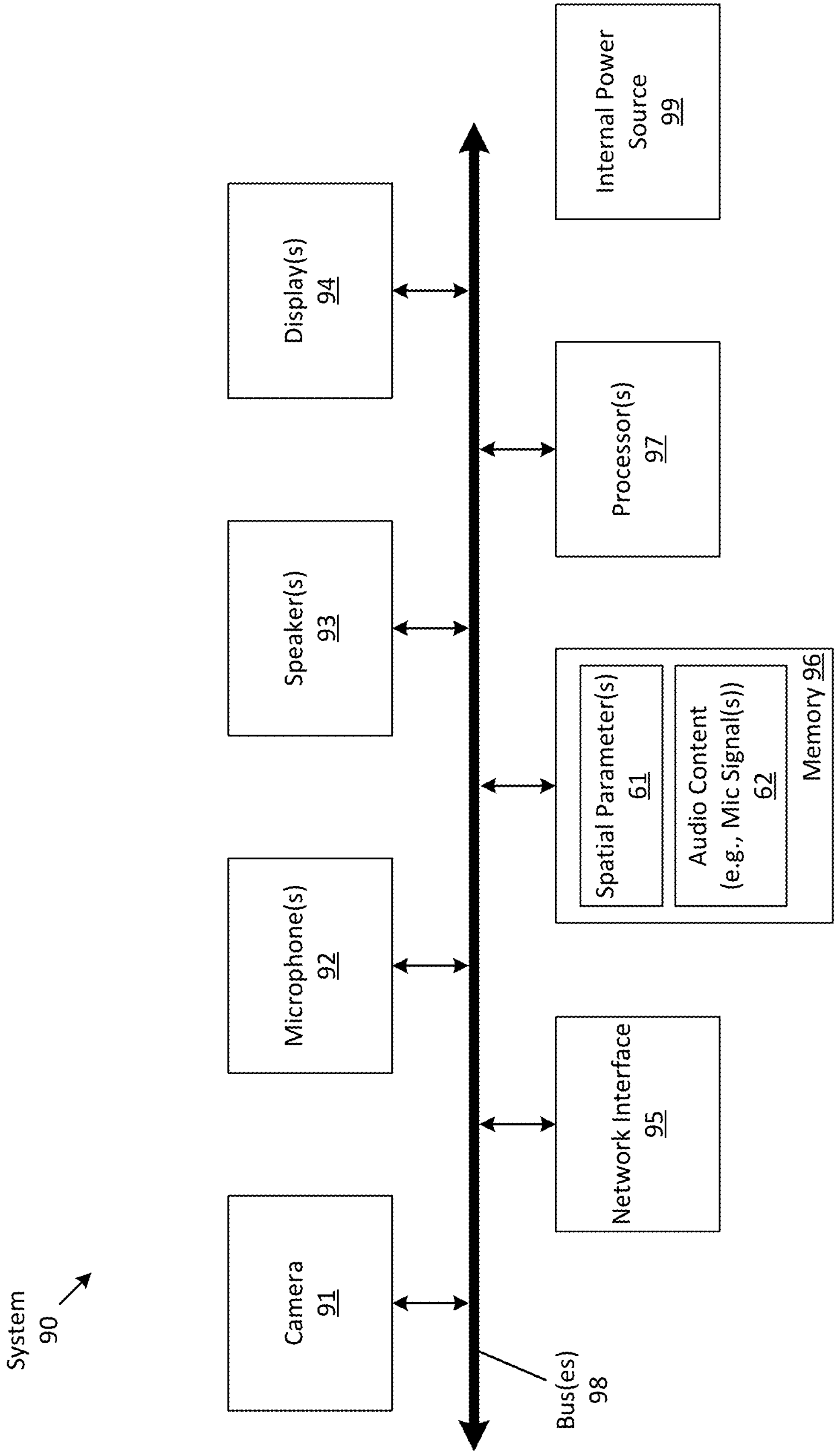
FIG. 6 illustrates an example of system hardware.

FIG. 6 shows a block diagram of hardware of an audio processing system 90 that may be configured to estimate parameters, in one aspect, which may be used with or be a part of any of the aspects described herein (e.g., system 10, which may include the media content device 12, playback device 14, and/or output device 15 or 16). This audio processing system 90 can represent a general-purpose computer system or a special purpose computer system. Note that while FIG. 6 illustrates the various components of an audio processing system that may be incorporated into one or more of the devices described herein, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated if other types of audio processing systems that have fewer components than shown or more components than shown in FIG. 6 can also be used. Accordingly, the processes described herein are not limited to use with the hardware and software of FIG. 6.

As shown in FIG. 6, the audio processing system (or system) 90 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 98 that serve to interconnect the various components of the system. One or more processors 97 are coupled to bus 98 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 96 can include Read Only Memory (ROM), volatile memory, and non-volatile memory, or combinations thereof, coupled to the bus using techniques known in the art. Camera 91, microphone(s) 92, speaker(s) 93, and display(s) 94 may be coupled to the bus.

Memory 96 can be connected to the bus and can include DRAM, a hard disk drive or a flash memory or a magnetic optical drive or magnetic memory or an optical drive or other types of memory systems that maintain data even after power is removed from the system. In one aspect, the processor 97 retrieves computer program instructions stored in a machine-readable storage medium (memory) and executes those instructions to perform operations described herein.

As shown, the memory 96 includes one or more spatial parameters 61 and audio content (e.g., captured microphone signals) 62. In one aspect, the spatial parameters may be the selected parameters, as described at decision block 47 of process 40 in FIG. 4, which are stored as being the most optimal estimated spatial parameters. Examples of these spatial parameters may include one or more DoAs of one or more sound sources, a reverberance value, a diffuseness value, and a sound energy value. As described herein, these parameters may represent spatial characteristics of a 3D sound field of audio content. For instance, the spatial parameters may represent the characteristics for the entire duration of the audio content, or may represent characteristics of a portion of the audio content. In which case, one piece of audio content may include multiple spatial parameters that may be associated with different portions (segments) of the audio content. This may be the case due to the audio content's sound field changing, such as an airplane flying from one side of the sound field to another. In which case, a DoA of the sound source of the airplane may track the movement of the airplane within a period of time. In one aspect, the audio content 62 may be the received audio content from which the spatial parameters 61 may be estimated.

Audio hardware, although not shown, can be coupled to the one or more buses 98 in order to receive audio signals to be processed and output by speakers 93. Audio hardware can include digital to analog and/or analog to digital converters. Audio hardware can also include audio amplifiers and filters. The audio hardware can also interface with microphones 92 (e.g., microphone arrays) to receive audio signals (whether analog or digital), digitize them if necessary, and communicate the signals to the bus 98.

The network interface 95 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 98 can be connected to each other through various bridges, controllers and/or adapters as is well known in the art. In one aspect, one or more network device(s) can be coupled to the bus 98. The network device(s) can be wired network devices (e.g., Ethernet) or wireless network devices (e.g., WI-FI, Bluetooth). In some aspects, various aspects described (e.g., parameter estimation, parametric analysis, rendering, filter estimation, etc.) can be performed by a networked server in communication with one or more devices of the system.

The system 90 includes an internal power source 99, which may be arranged to power one or more hardware elements of the system 90. For example, the power source 99 may be an internal battery that may be housed within a device of the system 90. Such a device may include a portable electronic device such as smartphone or a tablet computer, or a head-worn device, such as a headset (e.g., in-ear headphones).

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the spatial audio processing operations to estimate parameters for parametric analysis operations, network operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by at least one programmed processor of an electronic device, the method comprising:

receiving audio content;

for a first plurality of points associated with a three-dimensional (3D) sound field of the audio content, estimating a first plurality of spatial parameters associated with the audio content;

generating a second plurality of points associated with a region of the 3D sound field of the audio content based on a comparison of the first plurality of spatial parameters of the first plurality of points, wherein the first plurality of points comprises less points than the second plurality of points;

for the second plurality of points, estimating a second plurality of spatial parameters associated with the audio content;

determining whether at least one spatial parameter of the second plurality of spatial parameters is greater than or equal to a threshold; and responsive to determining that the at least one spatial parameter is greater than or equal to the threshold, storing the at least one spatial parameter associated with the audio content.

2. The method of claim 1, wherein the first plurality of points are arranged on a spherical grid of the 3D sound field, wherein the region is a conical spherical shaped section of the spherical grid of the 3D sound field.

3. The method of claim 2, wherein the threshold comprises a first threshold, wherein the method further comprises:

determining that a spatial parameter of the first plurality of spatial parameters is greater than or equal to a second threshold based on the comparison; and generating the conical spherical shaped section centered at a point associated with the spatial parameter, wherein the second plurality of points comprises the point.

4. The method of claim 2 further comprising generating the first plurality of points as a predefined number of points at predefined locations on the spherical grid.

5. The method of claim 1 further comprising:

responsive to determining that none of the second plurality of spatial parameters are greater than or equal to the threshold, reducing the region of the 3D sound field of the audio content;

estimating a third plurality of spatial parameters associated with the audio content for a third plurality of points associated with the reduced region, and storing at least one of the third plurality of spatial parameters in memory.

6. The method of claim 1, wherein the first plurality of points is an order of magnitude less than the second plurality of points.

7. The method of claim 1, wherein the first plurality of spatial parameters or the second plurality of spatial parameters comprise at least one of a direction of arrival, a reverberance value, a diffuseness value, and a sound energy value.

8. An electronic device, comprising:

at least one processor; and memory having instructions stored therein which when executed by the at least one processor causes the electronic device to:

receive audio content, for a plurality of points associated with a three-dimensional (3D) sound field of the audio content, estimating a plurality of spatial parameters associated with the audio content;

determining a region of the 3D sound field based on a comparison between the plurality of spatial parameters;

iteratively, reducing the region of the 3D sound field and estimating new spatial parameters associated with the audio content for one or more new points in the reduced region, until one or more new spatial parameters meet or exceed a threshold, wherein each region comprises a density of new points that is higher than a density of the plurality of points of the 3D sound field; and store the one or more new spatial parameters in the memory.

9. The electronic device of claim 8, wherein the plurality of points are arranged on a spherical grid and the region is a conical spherical shaped section of the spherical grid, wherein each reduced region is a smaller conical spherical shaped section of the spherical grid.

10. The electronic device of claim 8, wherein each reduced region is smaller and has a higher density of new points than each previous iteration of the reduced region.

11. The electronic device of claim 8, wherein the audio content comprises a plurality of channels in an ambisonics format.

12. The electronic device of claim 8 comprises a portable device with an internal power source.

13. The electronic device of claim 8 further comprises one or more microphones, wherein the instructions to receive audio content comprises receiving, as one or more microphone signals captured by the one or more microphones, sound of an ambient environment as the 3D sound field.

14. A non-transitory machine-readable medium having instructions which when executed by at least one processor of an electronic device causes the electronic device to:

for a first plurality of points associated with a three-dimensional (3D) sound field of audio content, estimate a first plurality of spatial parameters associated with the audio content;

generate a second plurality of points in a region of the 3D sound field of the audio content based on a comparison of the first plurality of spatial parameters of the audio content, wherein the first plurality of points comprises less points than the second plurality of points;

for the second plurality of points, estimate a second plurality of spatial parameters associated with the audio content;

select at least one of the second plurality of spatial parameters that is greater than a remainder of the second plurality of spatial parameters or a threshold value; and store at least one of the second plurality of spatial parameters associated with the audio content.

15. The non-transitory machine-readable medium of claim 14 comprising further instructions to:

select a point of the first plurality of points based on its corresponding spatial parameter's relationship with spatial parameters of neighboring points of the first plurality of points; and creating the region to include the selected point.

16. The non-transitory machine-readable medium of claim 15, wherein the point is a part of the second plurality of points in the region.

17. The non-transitory machine-readable medium of claim 14, wherein the first plurality of points are arranged uniformly on a surface of spherical grid of the 3D sound field, and the second plurality of points are arranged non-uniformly on a surface of the region that is a conical spherical shaped section of the spherical grid.

18. The non-transitory machine-readable medium of claim 14, wherein the first plurality of points have less than thirty points.

* * * * *